No. 692,620. Patented Feb. 4, 1902.
N. CARTER.
FLOW PREVENTER.
(Application filed Aug. 1, 1901.)
(No Model.)
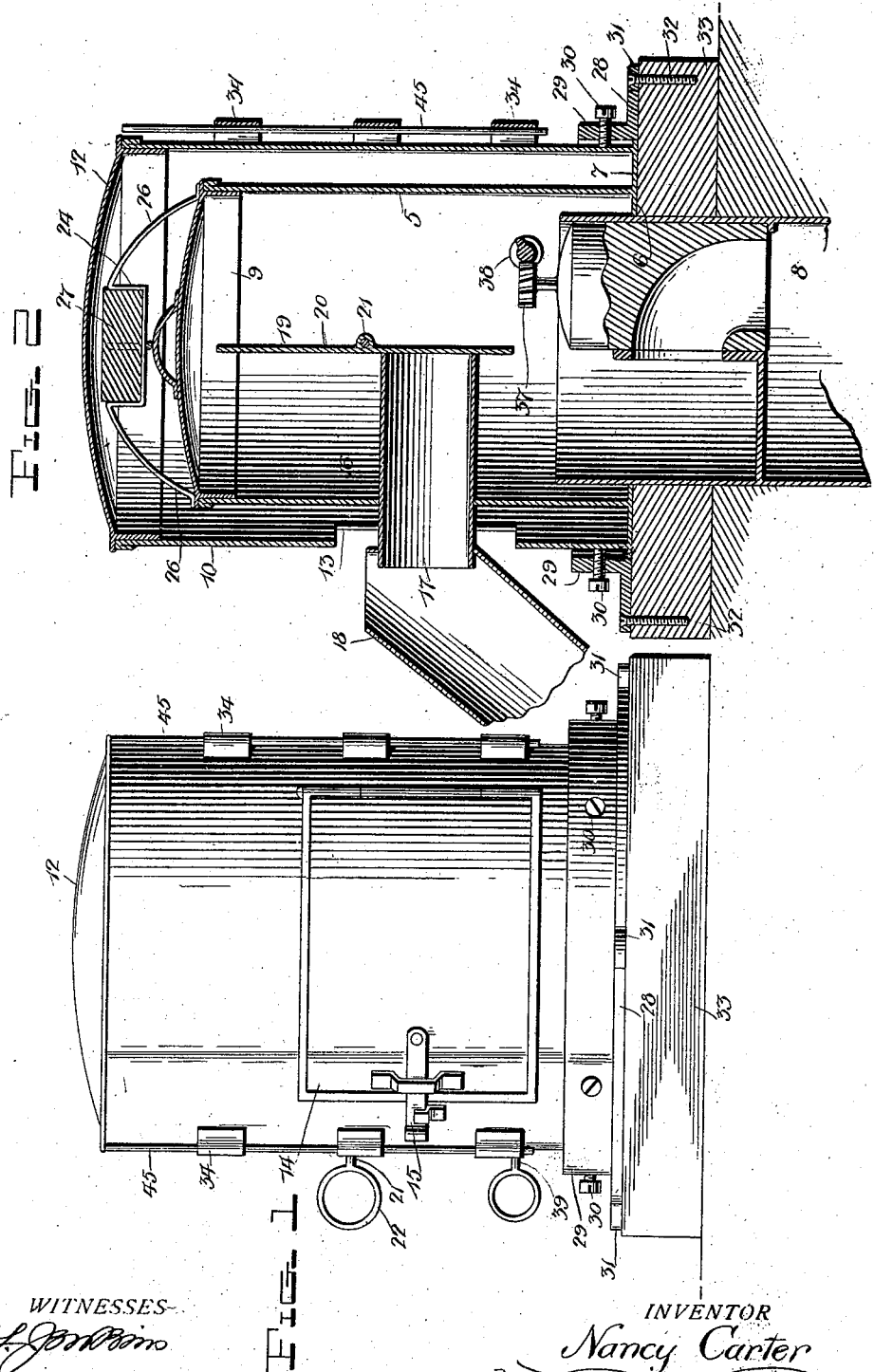
WITNESSES
INVENTOR
Nancy Carter
THE NORRIS PETERS CO., PHOTO-LITHO., WASHINGTON, D. C.

UNITED STATES PATENT OFFICE.

NANCY CARTER, OF YAZOO CITY, MISSISSIPPI.

FLOW-PREVENTER.

SPECIFICATION forming part of Letters Patent No. 692,620, dated February 4, 1902.

Application filed August 1, 1901. Serial No. 70,528. (No model.)

*To all whom it may concern:*

Be it known that I, NANCY CARTER, a citizen of the United States, residing at Yazoo City, in the county of Yazoo, State of Mississippi, have invented certain new and useful Improvements in Flow-Preventers; and I do hereby declare the following to be a full, clear, and exact description of the invention, such as will enable others skilled in the art to which it appertains to make and use the same.

This invention relates to devices for preventing or regulating the flow of oil from oil-wells; and it has for its object to provide a cap for the well-casing into which the oil will flow and the flow of oil from which may be regulated or entirely cut off.

Other objects and advantages of the invention have reference to the specific structure of the device and will be understood from the following description.

In the drawings forming a portion of this specification, and in which like numerals of reference indicate similar parts in both views, Figure 1 is an elevation showing the device applied to an oil-well. Fig. 2 is a vertical section through the device and the upper portion of the well-casing to which it is attached.

In the drawings there is shown a flow-preventer embodying the present invention and including a central cylindrical body 5, having an inwardly-directed flange 6 at its lower end and also an outwardly-directed flange 7, the flange 6 being adapted to fit snugly around the protruding upper end 8 of a well-casing, so that the oil that rises in the casing may pass into the body, said body having a lid or cover 9, which closes the upper end thereof. A cylindrical casing 10 is provided for the body 5 and is secured at its lower end upon the flange 7, the casing being separated from the body by an interspace and extending somewhat above the upper end thereof and having also a closure 12 at its upper end. In the side of the casing 10 is a doorway 13, having a hinged door 14, provided with a suitable latch 15, and opening through the side of the body 5 and communicating with the interspace between the body and casing at the doorway is a perforation 16, in which is fitted a spout 17, which latter is provided with a downturned discharge end 18, through which the oil may flow from the body 5 to the barrels to be filled.

To cut off the flow of oil through the spout, a damper 19 is provided, and consists of a disk 20, which is fixed to a shaft 21, journaled in the sides of the body 5 and passing diametrically thereof, one end of the shaft passing outwardly through the casing and having a handle 22 to facilitate rocking of the shaft. The shaft is in the plane of the inner end of the spout and slightly above the latter, so that when the shaft is rocked the disk will be moved to cover the inner end of the spout or to partially close it to reduce the flow of oil.

To provide against an excessive pressure that might lift the device from the casing or raise the covers thereof, the inner cover, which is the cover of the body 5, is provided with the basket 24, supported upon rods 26, attached to the cover, and in which basket is a weight 27.

As a means for holding the body positively against displacement from the casing a base is provided, and consists of a plate 28 of disk shape and which has a central opening to receive the casing, and at the edge of the opening is an upwardly-directed flange 29, having screws 30 engaged therewith and with the casing. The plate 28 has the radiating ears 31, which are perforated for engagement of lag-screws 32, which are screwed into a supporting-framework of wooden blocks, (shown at 33.)

On the outer face of the casing are the ears 34, in which are engaged the vertical rods 45, forming handles by means of which the device is lifted from place to place.

To entirely cut off flow of oil from the casing, a valve 35 is disposed therein and is provided with a turning-plug having a stem 36, which is extended upwardly and into the body 5, where it is provided with a gear 37, having a worm 38 engaged therewith and carried by a shaft 39, passed outwardly through the body 5 and its casing, this shaft having a hand-wheel at its outer end whereby the shaft may be oscillated to move the valve-stem in opposite directions to open or close the valve.

What is claimed is—

1. A device of the class described comprising an inner cylindrical body having inwardly and outwardly directed flanges at its lower end, the inwardly-directed flange being adapted to fit about a well-casing, a cylindrical casing inclosing the body and secured to the exterior flange thereof, a door-opening in the casing having a closure, a spout passed through the body and registering with the door-opening of the casing, and a closure for the spout.

2. A device of the class described comprising a cylindrical body having an inclosing casing spaced therefrom, a door-opening in the casing having a closure, a spout passed into the body and communicating therewith, the outer end of the spout being disposed adjacent to the door-opening, a pivoted disk within the body and disposed for movement to cover the inner end of the spout, means for rocking the disk into and out of closing position, a cover for the body having a weight-receptacle, and a cover for the casing, the body and casing being connected at their lower ends and the body having an inwardly-directed flange at its lower end constructed and arranged to snugly fit about a well-casing.

In testimony whereof I affix my signature in presence of two witnesses.

NANCY CARTER.

Witnesses:
BROCK GIBBS,
A. J. OAKES.